H. H. KINSEY.
BOX.
APPLICATION FILED APR. 27, 1907.

942,391.

Patented Dec. 7, 1909.
3 SHEETS—SHEET 1.

Witnesses

Inventor
Henry H. Kinsey
By H. H. Bliss
Attorney

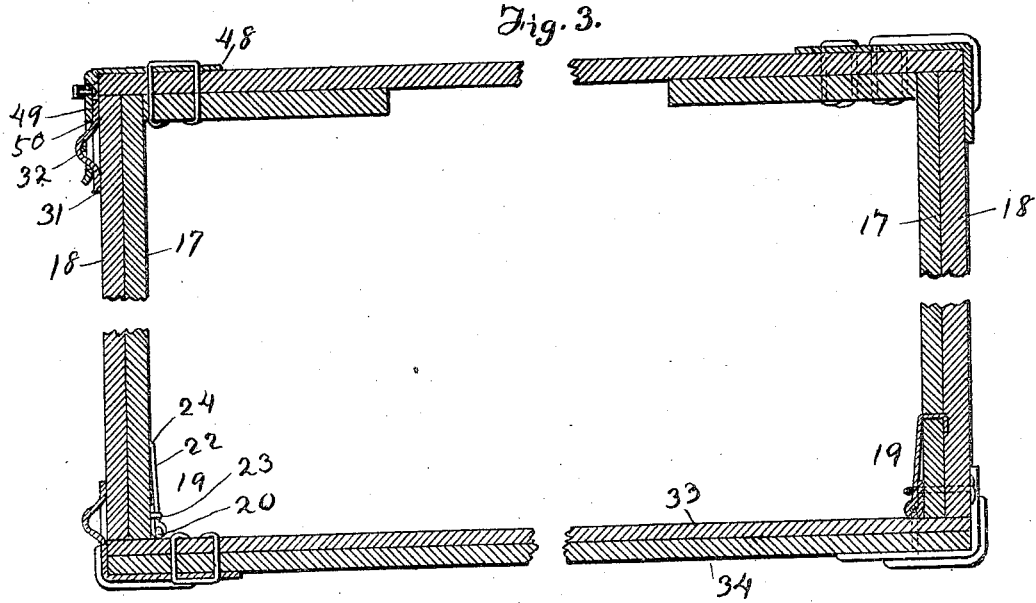
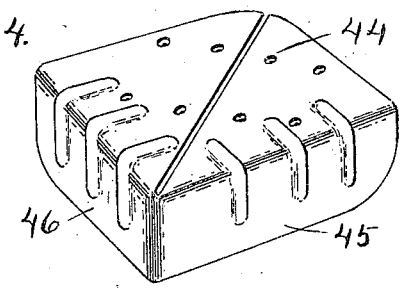
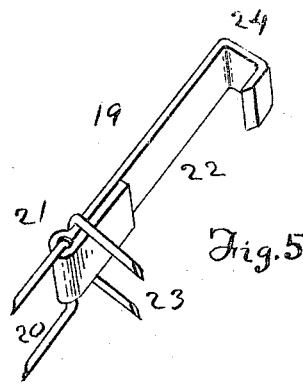
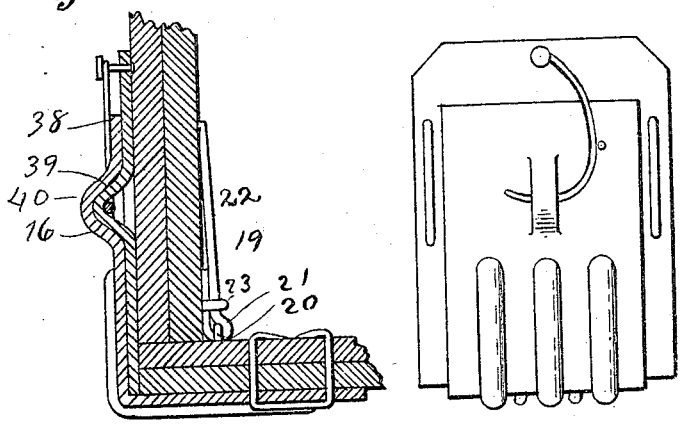

H. H. KINSEY.
BOX.
APPLICATION FILED APR. 27, 1907.
942,391.
Patented Dec. 7, 1909.
3 SHEETS—SHEET 3.
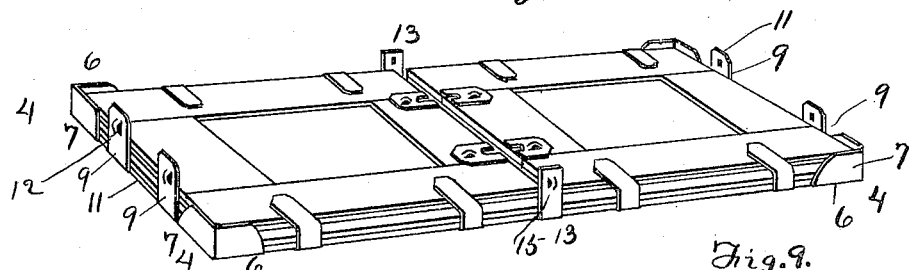
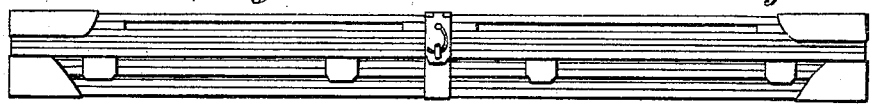
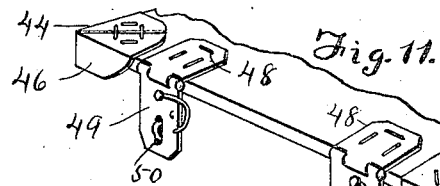
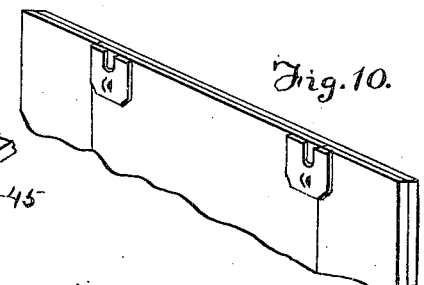
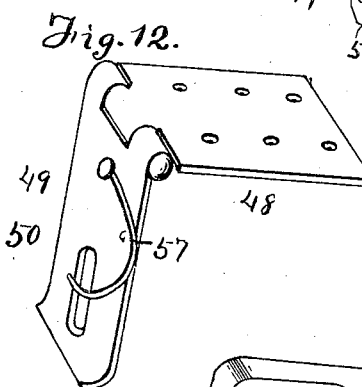
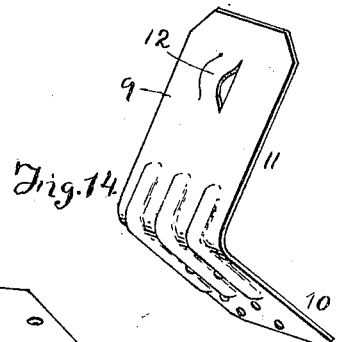
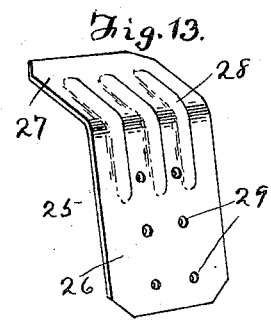
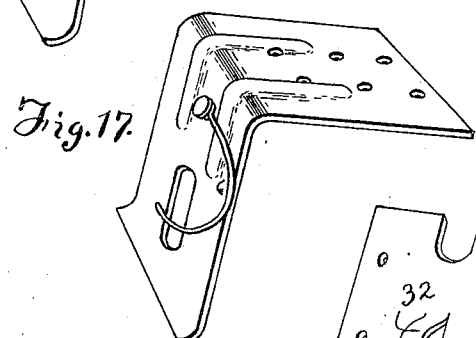
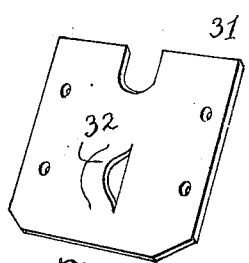
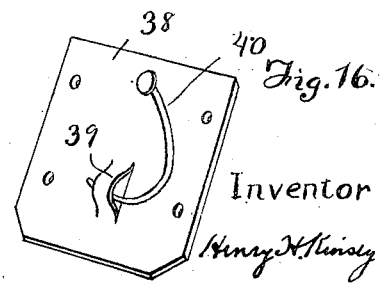
Witnesses
Inventor
Henry H. Kinsey
By H. H. Bliss
Attorney

UNITED STATES PATENT OFFICE.

HENRY H. KINSEY, OF OGDEN, UTAH, ASSIGNOR, BY MESNE ASSIGNMENTS, TO KINSEY BOX COMPANY, OF OGDEN, UTAH, A CORPORATION OF UTAH.

BOX.

942,391.  Specification of Letters Patent.  Patented Dec. 7, 1909.

Application filed April 27, 1907. Serial No. 370,669.

*To all whom it may concern:*

Be it known that I, HENRY H. KINSEY, a citizen of the United States, residing at Ogden, in the county of Weber and State of Utah, have invented certain new and useful Improvements in Boxes, of which the following is a specification, reference being had therein to the accompanying drawing.

This invention relates to improvements in boxes, crates and similar articles, particularly to those of the class which are collapsible, that is, have their parts or sections so constructed that they can be readily assembled and related in such way as to form an inclosing structure for the carrying of goods and can also have their several sections readily separated one from another and re-arranged in a compact condition for transportation at times when they are not intended to carry contents.

Figure 1:
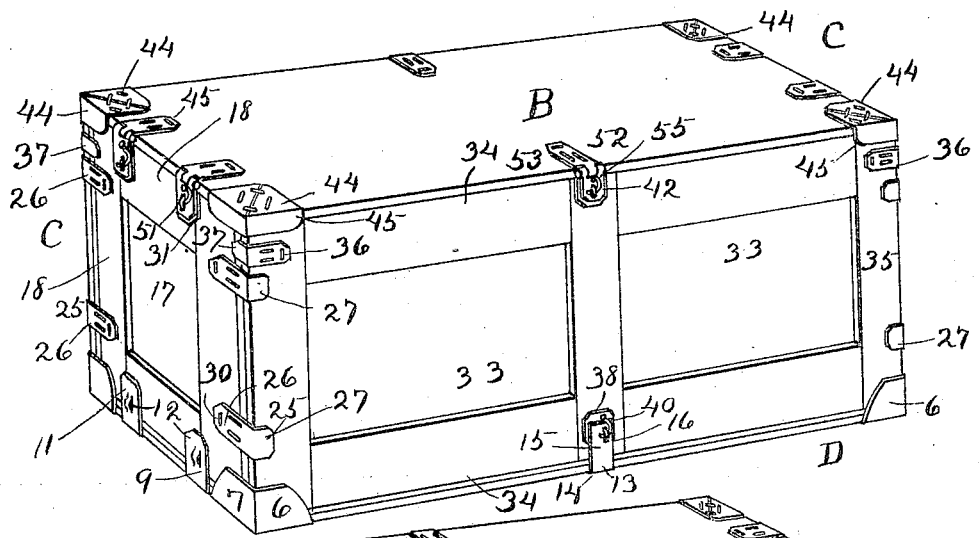
Figure 2:
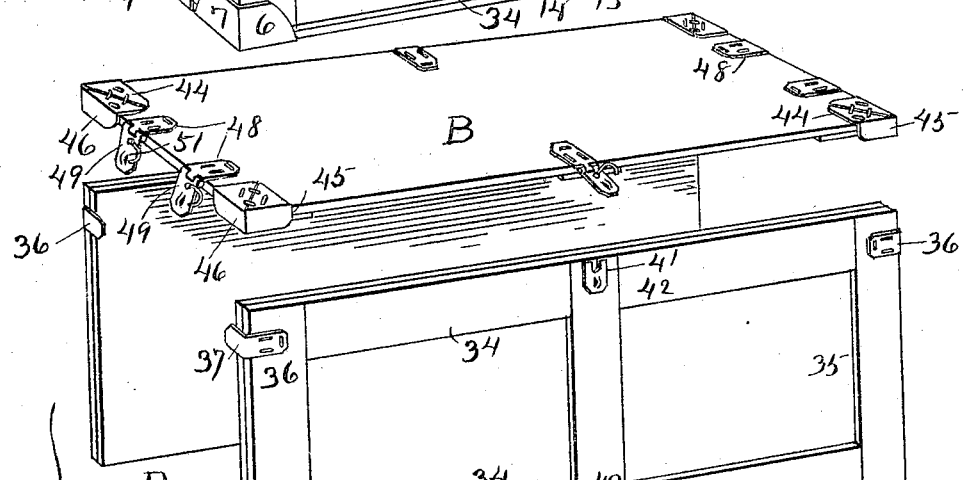
Figure 2:
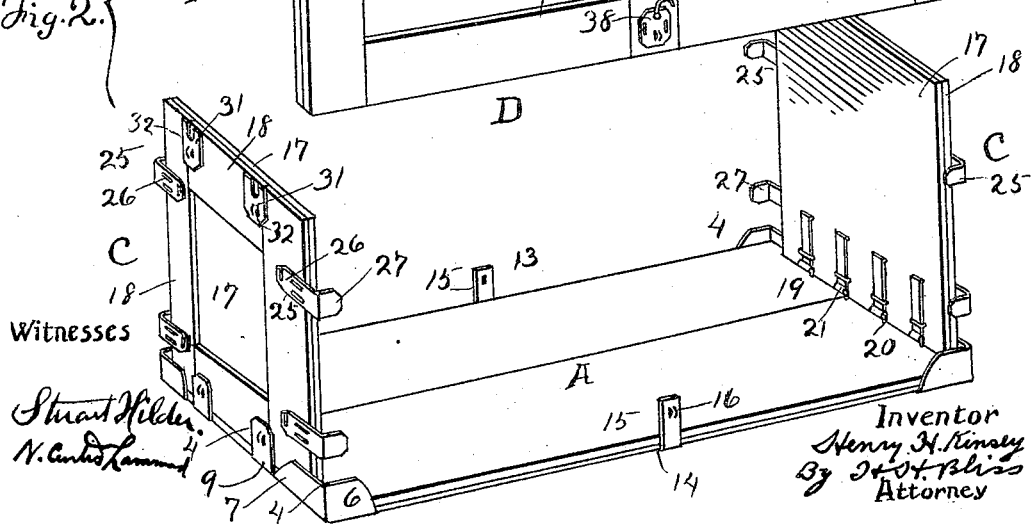

Figure 1 is a perspective view of a box structure embodying my improvements. Fig. 2 is a perspective showing the several wall sections of the box in position, respectively, at the times when the sides and top are being separated from, or are at being assembled with, each other. Fig. 3 is a vertical section on the line $x$, $x$, of Fig. 1. Fig. 4 is a perspective of one of the bracing reinforcers or corner angle plates of the top. Fig. 5 is a perspective of one of the hinging devices connecting the bottom with the end pieces. Fig. 6 is a partial section showing one of the metallic bracing and locking devices and the adjacent parts of the box. Fig. 7 is a face view of the brace and lock shown in Fig. 6. Fig. 8 is a perspective of the bottom and the end sections when the latter are folded down upon the bottom. Fig. 9 is a side edge view of the package produced by folding all the parts of the box together and locking them in their knockdown relation. Fig. 10 is a perspective of the upper part of one of the end sections. Fig. 11 is a perspective of the end part of the top or cover. Fig. 12 is a perspective of the lock elements secured to the cover. Fig. 13 is a perspective of a brace iron. Fig. 14 is a perspective of a brace iron and locking element. Fig. 15 shows one of the lock elements of the end-piece. Fig. 16 shows one of the lock elements secured to the lower edge of the side. Fig. 17 shows a modification of the device illustrated in Fig. 12.

In the drawings A represents the bottom of the box, B the top, C, C, the ends and D, D the sides. The bottom is shown as being formed of wider boards 1, 1 and narrower cross pieces or cleats 2, 2 at the ends, and an intermediate or central cleat 3. It is further provided at the corners with metallic reinforcers and braces each indicated as a whole by 4, and comprising a fastening part or base plate 5, together with an upwardly turned flange 6 at the side and a flange 7 at the end. At each of its ends it is also provided with metallic clip pieces which are indicated by 9, each having an arm 10 secured to the under face of the bottom, and an upwardly turned arm 11 which extends upward from and beyond the end edge. Preferably there are two or more of these metallic clips secured to and projecting upward from the bottom. Two of them should be arranged substantially as shown, that is to say situated at points near the inner end of the flange 7 of the reinforce brace plate 4. The upwardly turned arms 11 of these metallic clips are provided with eyes 12, preferably formed by cutting a tongue of suitable length from the sheet of metal itself and bending the tongue outward far enough to form a loop such as illustrated. When the box is intended to carry a heavy weight I attach to the bottom supplemental metallic clips 13, one or more at the sides. Each is formed to have the lower plate 14 which lies against and is secured to the under face of the box bottom and to have the upward extending plate 15 on which there is a tongue 16 for the purpose to be described. The ends of the box (each indicated as an entirety by the letter C as above stated) are also formed mainly of wood, the body part being formed of thin boards 17 reinforced by strips 18 at the edges when made in the way illustrated in the drawing. These end parts are permanently connected to the bottom by hinges at 19. Each of these is formed of two elements, one of these elements being staple 20, which is inserted into the wood of the bottom section and clenched on the outer, or under, face. The other element of the hinge consists of a loop 21 in the metal strip 22, which is secured near its lower end by a staple 23, and at the upper end has a bend 24 that is turned outward and passed through the wood of the end piece and clenched, the bent or clenched end lying between the boards 17 and the lower reinforcing strip 18. In addition to the hinges above described these end parts C of the box are provided with metallic braces and guides for the side walls. As shown in the drawings there are four of these metallic attachments, two at each side of the end, being indicated by 25. Each consists of the plate 26 parallel to the end and a plate 27 parallel to the side of the box. They are formed of relatively thin sheet metal bent at approximately right angles to provide these plates 26, 27. In order to utilize relatively thin metal and at the same time have sufficient strength, corrugations are formed adjacent to and around the bend as shown at 28. At 29 apertures are punched or cut in the end plate 26. Through these apertures are passed the staples 30, these extending through the wood of the end wall, and having their ends clenched upon the inner surface. The side plates 27 serve not only as binders and braces against the outward strain exerted by the side walls but also provide guides for the latter walls when they are to be inserted into place as will be below described.

At the upper edges the end walls are each provided with a metallic clip plate 31, which is secured to the wood by staples in the way described. It is moreover formed with an outwardly extended staple, eye or tongue at 32 substantially similar to that shown at 12 and above described.

By examination of the drawings it will be seen that when the parts that constitute the bottom and end walls of the box are constructed in the way described the ends can be folded down upon the inner and upper face of the bottom and lie snugly and compactly in position, to which further reference will be made.

Each of the side walls is indicated as aforesaid by the letter D. If constructed in the way shown in the drawings it has main longitudinal boards 33, 33, and edge reinforcing strips or cleats as at 34 at the top and bottom and 35 at the ends. Each side wall is provided with devices for fastening or holding and bracing the box.

36, 37, indicate metallic angle clips each of which may be similar to that shown at 26, 27. The plate 37 lies against the end section of the box and receives the outward or bulging strains that would tend to force the end outward. The plates 27 of the angle clips on the end sections are remote from the side edges of the end sections a distance equal to the thickness of the wood of the side section. Consequently, the side sections, as entireties, are adapted to slide or be slipped edgewise downward into their positions, moving along the said edges of the end section until their corners are snugly seated behind the said flanges 6 on the corner reinforces of the bottom. When one of the sides has reached its normal position its lower edge rests upon the top surface of the edge of the bottom. In boxes to carry heavy weights such as illustrated the side section D is also provided with a fastening plate 38 at the center of its lower edge corresponding in position to the metallic angle clip 13 on the bottom above described. This metallic plate 38 is formed with a loop or eye 39 which is adapted to register with and fit into the loop or eye 16 on the clip 13.

40 is a lock pin or hook movably connected to the plate 38 and adapted to pass into and through the eye or loop 39 and thus lock together the metallic parts 38 and 13 and also bind together the side wall and the bottom section, preventing either from bulging or sagging at this place of union. And in boxes of the sort last referred to it is also preferable to have a metallic plate 41 near the upper edge of each side section for effecting a fastening of the cover at this point. It is provided with a tongue or eye 42.

The cover or top wall B of the box is formed mainly of wood having longitudinal boards and cross cleats or battens at each corner, and, like the bottom, has a bracing device, presenting a base plate 44, a flange 45 for the side of the box, and a flange 46 for the end. At each end of this cover there are metallic devices corresponding to the clip plates 31 on the end sections. Each of these metal devices on the cover comprises a top plate 48 which is secured by staples to the wood of the cover and an end plate 49 which is hinged to the plate 48. Each plate 49 has an aperture 50 through which passes the eye or loop 32 on a plate 31. And 51 is a hook hinged to the plate 49 and adapted to be passed through the loop or eye 32 to lock the cover to the end section.

At the center of the side edge of the cover there is a metallic fastening device 52 having parts similar to those at 48, 49 and 50, registering in position with the plate 41 on the side section above described. It has an upper plate 53 secured to the wood of the cover and a side plate 54 provided with an aperture or slot 55. When the hinged piece 54 is turned down the eye 42 on the plate 41 at the side passes through the slot 55 and then the hook 43 can engage with this eye and lock the side and the cover together at this point.

When the parts of the box are assembled, it will be seen that each side section is at each end held in place by the flange 45, on the top reinforce, the plates 27 carried by the end section and the flange 6 carried by the bottom. It will also be seen that the end sections are held firmly in place by the plates 37 on the angle clips 36, 37, the end flanges 7 and 46 of the reinforce plates of the bottom and top sections, the angle clips 9 at the bottom and the hinge fasteners at 47, of the cover.

The hinges above described will ordinarily form a sufficiently strong connection between the ends and the bottom of the box or crate, but I may provide an additional attachment between such ends and bottom, comprising a metallic device 56, which is or may be similar to that shown at 38. These devices 56 are permanently attached to the end and arranged to coöperate with the clip pieces 9, having each a tongue 57 which is a little smaller than the tongue of the clip piece 9 and arranged to lie within the said tongue or loop of the clip piece 9 when the box is set up. In this position the hook 58 of the device 56 may be passed within both of said loops, lying on the outer face of the clip piece 9 so as to securely unite the parts.

The devices 31 and 52 need not necessarily be constructed of parts hinged together but may each be made in the form of an angle piece having its horizontal and vertical flange integral. In interlocking the said devices when thus formed with their corresponding looped clip pieces the free tongue or flange may be slightly sprung outward to pass over the clip piece, the spring of the metal thus taking the place of the hinge first described. This last described construction is shown in Fig. 16.

It will be observed that the braces and guides 25 and the metallic angle clips 36, 37 constitute means whereby the ends and sides hold each other, by a sliding engagement, from moving outward.

What I claim is:

The combination of a bottom having angle bracing arms, each provided with a vertical plate on the side of the box and a vertical plate on the end of the box, the ends hinged to the end edges of the bottom and adapted when in vertical position to rest against the said vertical plates on the end of the box, the top section or cover having corner angle plates each formed with a flange on the end of the box and a flange on the side of the box adapted to lie outside of and to laterally support the end and side sections of the box, the side sections adapted to lie against the vertical end edges of the ends of the box and to be slid from above into assembled position with respect to the ends and bottom, right-angled clips secured to the outside faces of the hinged ends of the box and slidably engaging the end edges of the sides of the box, and right-angled clips secured to the outside faces of the slidable sides of the box and slidably engaging the outside faces of the ends of the box at points above the said clips secured to the ends of the box, and means for detachably locking the bottom and the top to the ends of the box.

In testimony whereof I affix my signature, in presence of two witnesses.

HENRY H. KINSEY.

Witnesses:
 HORACE S. FOSTER,
 FRANK KIEFER.